United States Patent
Dhont et al.

(10) Patent No.: US 7,553,226 B2
(45) Date of Patent: Jun. 30, 2009

(54) GRAIN CLEANING SYSTEM FOR A COMBINE HARVESTER

(75) Inventors: André G. J. Dhont, Maldegem (BE); Johnny Bossuyt, Torhout (BE); Frank R. G. Duquesne, Zwevegem (BE); Tom N. N. Somers, Lotenhulle (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/214,356

(22) Filed: Jun. 18, 2008

(65) Prior Publication Data

US 2008/0318650 A1 Dec. 25, 2008

(30) Foreign Application Priority Data

Jun. 25, 2007 (GB) ................. 0712189.0

(51) Int. Cl.
*A01F 12/32* (2006.01)
(52) U.S. Cl. ..................................... 460/101
(58) Field of Classification Search .............. 460/5, 460/69, 73, 91, 101, 145, 902; 56/16.5
See application file for complete search history.

(56) References Cited

U.S. PATENT DOCUMENTS

| 3,593,719 | A | * | 7/1971 | Ashton et al. ................. 460/73 |
| 3,757,797 | A | * | 9/1973 | Mathews ...................... 460/91 |
| 4,344,443 | A | | 8/1982 | De Busscher et al. |
| 6,672,957 | B2 | * | 1/2004 | Voss et al. .................. 460/101 |

FOREIGN PATENT DOCUMENTS

GB 1397939 6/1975

\* cited by examiner

*Primary Examiner*—Robert E Pezzuto
(74) *Attorney, Agent, or Firm*—Michael C. Harms; John William Stader; Patrick M. Sheldrake

(57) ABSTRACT

A grain cleaning system for a combine harvester, comprises a frame supporting a grain pan and a sieve. The grain pan receives grain and chaff separated from the crop by a threshing mechanism and is reciprocable relative to the frame in order to separate the grain from the chaff and to propel the grain and chaff towards the sieve. The sieve is reciprocable relative to the frame and is connected to the frame by front and rear support arms and that are pivotably secured to the frame and to the sieve. In the invention, the front support arms have different geometries from the rear support arms such that when the sieve is reciprocated relative to the frame, the vertical component of oscillation is greater at the front end than at the rear end of the sieve.

8 Claims, 1 Drawing Sheet

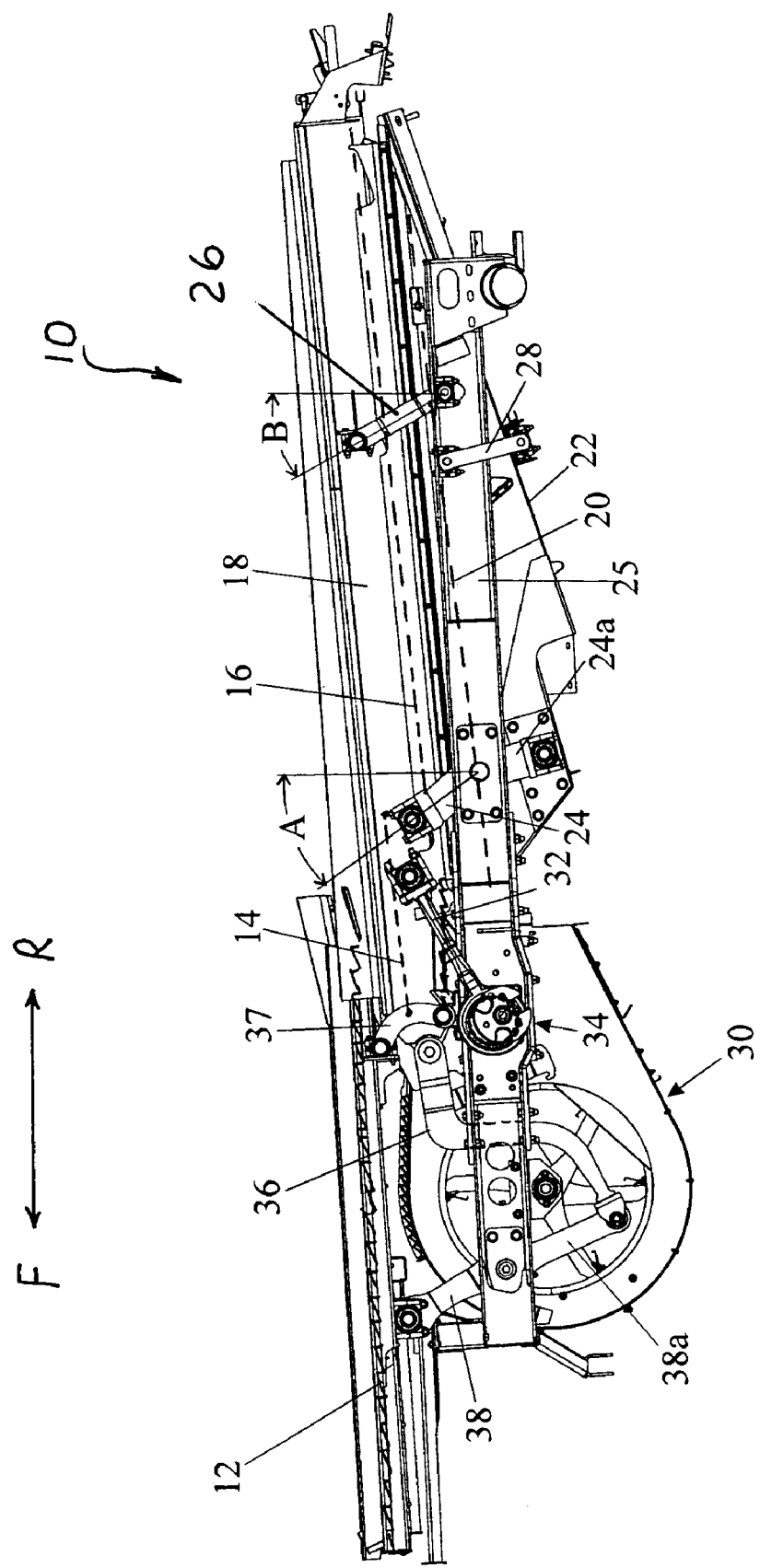

GRAIN CLEANING SYSTEM FOR A COMBINE HARVESTER

CROSS REFERENCE TO RELATED APPLICATIONS

This Patent Application claims priority under 35 U.S.C. § 119 to GB0712189.0, filed on Jun. 25, 2007 titled, "Grain Cleaning System for a Combine Harvester" and having André G. J. Dhont, Johnny Bossuyt, Frank R. G. Duquesne, and Tom N. N. Somers as inventors. The full disclosure of GB0712189.0 is hereby fully incorporated herein by reference.

FIELD OF THE INVENTION

The present invention relates to a grain cleaning system for a combine harvester, comprising a frame supporting a grain pan and at least one sieve, the grain pan being operative to receive grain and chaff separated from the other crop residue by a threshing mechanism and being reciprocable relative to the frame in order to propel the grain and chaff towards the sieve, and the sieve being reciprocable relative to the frame and being connected to the frame by front and rear support arms that are pivotably secured to the frame and to the sieve.

BACKGROUND OF THE INVENTION

A combine harvester incorporating a grain cleaning system as summarised above is known from U.S. Pat. No. 4,344,443 which for convenience is incorporated herein by reference to avoid the need to describe a complete combine harvester. The present invention provides an improvement over the grain cleaning system shown in FIG. 2 of the latter patent.

As described in greater detail in U.S. Pat. No. 4,344,443, in a combine harvester, crop is cut and advanced by a header into an elevator assembly which feeds the crop into a threshing mechanism. The latter beats the crop to separate the bulk of the grain from the straw, the grain dropping onto a grain pan and the straw being transported by a straw walker to the rear of the combine harvester. As the straw is moved along by the straw walker, some more grain may drop from it and be guided by a sloping tray onto the grain pan. The straw can be dropped in a swath behind the harvester or it may be spread evenly over the ground, sometimes after it has been chopped.

Aside from the grain, chaff drops onto the grain pan and needs to be separated from it. The purpose of the grain cleaning system is to separate the grain from the chaff so that only the grain may be collected and conveyed by an auger to the grain storage tank of the combine harvester while the chaff is discarded.

The grain pan is a non-perforated tray made of sheet metal with transversely extending corrugations. The pan is reciprocated to cause the grain to hop towards the rear of the harvester, eventually to fall onto a reciprocating sieve, usually the upper of a stack of two or more sieves. Conventionally, the sieves comprise series of pivotable louvers, which may be set to a range of sieve openings. During their transport along the grain pan, the grains tend to migrate to the bottom of the grain pan, such that the upper portion of the crop layer at the end of the grain pan primarily contains lighter chaff particles.

A blower blows air onto the grain and the chaff as they fall from the grain pan onto the upper sieve and also blows air through the sieves. This keeps the less dense chaff in suspension while allowing the individual grains to drop between the sieve louvers into a collector. The reciprocation of the sieves once again causes the material to hop and to migrate towards the rear of the combine harvester. The tossing of the grain by the sieves tends to separate individual grains from any husks surrounding them but some grains may still remain trapped in incompletely threshed ears, termed the tailings, which fall off the rear end of the upper sieve. Such tailings are separately collected at the bottom of the cleaning mechanism and transported by a second auger for re-processing.

The overall capacity of combine harvesters is constantly being increased to meet customer demand and this places ever greater requirements on the grain cleaning system. To increase cleaning capacity larger accelerations need to be applied to the sieves, which themselves need to be constructed more sturdily to withstand the additional weight of the grain. However, vigorous vibration of large out of balance masses causes operator discomfort and can lead to breakdown through fatigue in the mechanical components of the cleaning system.

For efficient grain cleaning it is primordial to assure a steady transport and a continuous layer of chaff and grain mixture along the sieves. Otherwise heaps of crop material will develop which can no longer be penetrated by the air flow to discard the chaff particles, while the air tends to escape through the lightly loaded sieve sections. Such situations are harder to avoid when the overall crop load increases.

SUMMARY OF THE INVENTION

In accordance with the present invention, there is provided a grain cleaning system for a combine harvester, comprising a frame supporting a grain pan and a sieve, the grain pan being operative to receive grain and chaff separated from the other crop residue by a threshing mechanism and being reciprocable relative to the frame in order to propel the grain and chaff towards the sieve, and the sieve being reciprocable relative to the frame and being connected to the frame by front and rear support arms that are pivotably secured to the frame and to the sieve, characterised in that the front support arms have different geometries from the rear support arms such that when the sieve is reciprocated relative to the frame, the vertical component of oscillation is greater at the front end than at the rear end of the sieve.

The invention achieves an enhanced throwing action at the front end of the sieve, where a large amount of crop material is supplied from the rear end of the grain pan. It also achieves an enhanced sifting action at the rear end of the sieve, where less crop material is present, part of the material being airborne by the fan flow and grain kernels being sifted through the sieve during its travel along the sieve surface.

When using a manual sieve, such as when sifting soil or flour, one often adopts a hand motion similar to that used for flipping pancakes, with the sieve being tilted abruptly at the same time as it is raised and lowered, instead of it maintaining a horizontal attitude. For a given effort, this action tends to throw the material at one end of the sieve higher and also propels it backwards more efficiently. The invention is predicated on the realisation that in a combine harvester it is likewise preferably not to impart the same vertical acceleration to the entire sieve but cleaning is improved by tilting the sieve as it oscillates so that the front end of the sieve, onto which grain is dropped by the grain pan, oscillates with a greater vertical amplitude component than its rear end.

In U.S. Pat. No. 4,344,443 the sieve is supported by what is often referred to as parallelogram arms. This is because the arms have equal length and inclination so that the locus of each point on the sieve as it oscillates is an arc which is identical in shape and size with the locus of every other point on the sieve. In the invention, by contrast, it is proposed to vary the geometries of the front and rear arms intentionally to achieve the desired improved tossing action of the grain.

It should be mentioned that sieves mounted on asymmetrical arms have been proposed previously, examples being found in EP 0 760 593, GB 939 075 and GB 1 397 939, but none of these geometries achieves a motion of the sieve in which the vertical component of oscillation is greater at the front than at the rear end.

Preferably, the geometries of the front and rear support arms are such that the horizontal component of oscillation at the rear end is greater than or equal to that at the front end of the sieve.

The desired tossing action of the sieve may be achieved in a particularly simple manner by inclining the front and rear support arms at different angles to the vertical. In the preferred embodiment of the invention, in their mean positions, the arm at the front of the sieve is inclined at 36° to the vertical and that at the rear of the sieve at 30° to the vertical.

The upper sieve in U.S. Pat. No. 4,344,443 reciprocates in phase with the grain pan and the lower sieve reciprocates with the opposite phase. Consequently, during their oscillation, the heavier sieve and the grain pan, together with the heavy weight of grain that they support are balanced only by the lighter lower sieve which reciprocates in anti-phase.

In accordance with a preferred embodiment of the invention, when two sieves are present, disposed vertically one above the other, the grain pan is reciprocated in anti-phase with the upper sieve but in phase with the lower sieve.

Conveniently, the upper sieve may be part of an upper sieve assembly, including an upper sieve shoe, reciprocated by means of a connecting rod pivotably secured at one end to the upper sieve assembly and journalled at its other end for rotation about an eccentric drive, such as an eccentrically driven crank pin, and the lower sieve assembly and the grain pan assembly are driven by the upper sieves by way of two-armed levers pivotably mounted on the frame.

By moving the upper sieve shoe in opposition the grain pan and the lower cleaning shoe, the out of balance vibrating mass is reduced considerably. This results in improved operator comfort and reduces mechanical stress on the structural elements of the cleaning system.

The oscillation of the upper sieve relative to grain pan, instead of the two being linked to one another for movement in unison, also results in better separation of grain and residue at the transition between the rear end of the grain pan and the front end of the upper sieve.

This effect follows from the fact that the step from the grain pan onto the sieve varies constantly. The design is such that, at the very moment the grain and chaff mixture is tossed over the grain pan edge, the vertical distance between grain pan and sieve is maximal. The fan directs a constant air flow through this gap. Because of the greater fall step, the crop layer in transition becomes more susceptible to air lift. A further advantage is a better use of the space within the combine harvester, where a greater fall step can be realised for given mean distance between the threshing and the cleaning mechanisms.

BRIEF DESCRIPTION OF THE DRAWINGS

The invention will now be described further, by way of example, with reference to the accompanying drawing which shows a grain cleaning system in accordance with the invention.

DETAILED DESCRIPTION OF THE PREFERRED EMBODIMENT

The grain cleaning system 10 in the drawing is viewed from the left hand side of a combine harvester and the arrows F and R point to the front and rear of the harvester. All references to front and rear that follow below are likewise relative to the direction of forward movement of the harvester.

Grain falls onto the front end of a grain pan 12 from a threshing system and from a separation system, which may comprise straw walkers or one or more separator rotors, neither of which systems is shown in the drawing. The reader unfamiliar with combine harvesters is referred to U.S. Pat. No. 4,344,443 for a fuller explanation of the other components of a combine harvester and how the grain cleaning system fits within the harvester.

The grain pan 12 is comprised in a grain pan assembly, which is oscillated to and fro (by a mechanism which will be described below), and by virtue of its corrugated surface it causes the grain to hop rearwards. This hopping initiates the separation of the grain from the chaff, as the grain kernels tend to migrate to the bottom of the grain pan 12, below the chaff particles. At the rear end of the grain pan 12, the grain drops onto a system of three sieves designated 14, 16 and 20 respectively. An upper sieve assembly comprises the sieve 14, termed a pre-sieve, and the sieve 16, termed the upper sieve, which are commonly mounted on a shoe 18, this being the name given to a framework of reinforcement girders surrounding the reticulated sieve surface. A lower sieve assembly comprises the lower sieve 20, which is supported by a shoe 22. A blower, generally designated 30, directs a blast of air to flow both along and through the sieves 14, 16 and 20.

All of the components so far mentioned are mounted on a frame or chassis 25. This frame may be part of the general harvester frame or may be mounted to the latter for pivotment about a general longitudinal axis for compensating lateral slopes. The blower 30 is fixed on the frame 25 but all the other components are movably supported on the frame 25 by pivoted front and rear support arms in a parallelogram-like configuration. In a true parallelogram configuration, the components would retain the same attitude relative to the frame as they oscillate but in the present invention this is not the case, at least in respect of the shoe 18 of the upper sieve 16.

The shoe 18 of the upper sieve assembly is supported on each side of the cleaning system by a front arm 24 and a rear arm 26. A reciprocating motion is imparted to the shoe 18 by a crank mechanism 34 which is connected to the shoe 18 by a connecting rod 32 journalled about an eccentric disk of the cranking mechanism at one end and pivotably secured to the shoe 18 at its other end. The support arms 24 and 26 are shown in the drawing in their mean position (half way between the top dead centre and the bottom dead centre positions of the connecting rod 32). Though the arms 24 and 26 are of substantially equal length, they are not parallel to one another, the arm being inclined at an angle A to the vertical while the arm 26 is inclined at a smaller angle B to the vertical. In the preferred embodiment of the invention, the angle A is 36° and the angle B is 30°. By virtue of this asymmetry, the ends of the arms 24 and 26 do not trace identical parallel arcs but instead the arc traced by the end of the arm 24 has a larger vertical component and a smaller horizontal component. It is this action which causes the front of the sieve 16 to toss the grain higher, and, because of its longer stroke, further towards the rear.

The shoe 18 is the only component driven directly by the cranking mechanism 34, the shoe 22 of the lower sieve assembly and the grain pan both being driven indirectly by way of the upper shoe 18. The shoe 22 carrying the lower sieve 20 is supported at its front end by an extension 24a of the arm 24 and at its rear end by an arm 28 that is pivotable relative to the shoe 22 and the frame 25. The lower extension 24a of the arm 24 and the arm 28 are parallel to one another and of substantially equal length to form a conventional parallelogram suspension that allows the sieve to move to and fro while remaining at the same angle to the horizontal. Because the two shoes 18 and 22 are connected to points on the arm 24 that lie on opposite sides of the frame 25, the two shoes always move in opposite directions so that they oscillate in anti-phase with one another.

The grain pan 12 is likewise mounted by parallelogram support arms 37 and 38 on the frame 25. Drive is transmitted from the shoe 18 of the upper sieve 16 to the grain pan 12 by an S-shaped arm 36 that is pivotally connected to the front portion of the upper shoe 18 at one end and at the other end is connected to a downward extension 38a of the front support arm 38. This geometry causes the grain pan 12 and the shoe 18 to oscillate in anti-phase with one another. As they oscillate, the pre-sieve 14 and the grain pan 12 do not just move to and fro but also up and down and as a result the step through which the grain must fall in moving from the grain pan 12 to the sieve 14 cyclically varies in height. The grain and chaff mixture does not travel continuously over the surface of the grain pan 12, but is tossed rearwardly in subsequent moves. The vertical distance between the grain pan 12 and the pre-sieve 14 is maximal at the very moment the grain and chaff mixture is tossed over the grain pan edge and falls to the front of the pre-sieve 14. As the fan 30 directs a constant air flow through this gap, the crop particles are susceptible to air lift during the full transition from the grain pan 12 and the pre-sieve 14.

By moving the upper sieve assembly (which typically weighs 250 kg) in opposition the grain pan assembly (100 kg) and the lower sieve assembly (170 kg) one obtains an out of balance vibrating mass of only about 20 kg (100+170−250 kg). This is substantially smaller than in the prior system where the out of balance vibrating mass is 180 kg (100+250−170). In this way, operator comfort is improved and the mechanical stress on the structure are correspondingly reduced.

The drive arm 36 is connected to the upper sieve shoe 18 forward of the connection point of the crank mechanism 34. The arrangement of the support arms 24, 26, 28, 37, 38 and the drive arm 36 provides for minimal reaction forces at the connection points of the arms and the sieve shoes 18, 22 during operation of the cleaning system.

To summarise, the described preferred embodiment therefore provides two important improvements over the prior art, as exemplified by U.S. Pat. No. 4,344,443. First, the improved tossing action at the front end of the sieve 16 throws the grain higher into the air at the point where it is most loaded and where it has the most effect, namely where the air stream from the blower acts to keep the chaff airborne. Second, the oscillation of the sieve in anti-phase with the grain pan has two advantageous effects, one being a reduction in the out of balance oscillating mass and the other being the increased step between the grain pan and the upper sieve at the moment of the fall of the crop material, which assists in separating the grain from the chaff.

The invention claimed is:

1. A grain cleaning system for a combine harvester, comprising a frame supporting a grain pan and an upper sieve, the grain pan being operative to receive grain and chaff separated from the other crop residue by a threshing mechanism and being reciprocable relative to the frame in order to propel the grain and chaff towards the sieve, and the sieve being reciprocable relative to the frame and being connected to the frame by front and rear support arms that are pivotably secured to the frame and to the sieve, wherein the front support arms have different geometries from the rear support arms such that when the sieve is reciprocated relative to the frame, the vertical component of oscillation is greater at the front end than at the rear end of the sieve, wherein in the mean positions of the front and rear support arms during a cycle oscillation of the upper sieve, the front and rear support arms are inclined to the vertical at different angles from one another, wherein, in their mean positions, the front and rear support arms are both inclined forwardly of the vertical, further wherein, in their mean positions, the front support arms are inclined forwardly at a larger angle to the vertical than the rear support arms.

2. A grain cleaning system as claimed in claim 1, wherein the geometries of the front and rear support arms are such that the horizontal component of oscillation at the rear end is greater than or equal to that at the front end of the sieve.

3. A grain cleaning system as claimed in claim 1, wherein in their mean position, the arm at the front of the sieve is inclined at 36° to the vertical and that at the rear of the sieve at 30° to the vertical.

4. A grain cleaning system as claimed in claim 1, wherein the sieve is the upper of two sieves disposed vertically one above the other, the upper sieve being part of an upper sieve assembly, the lower sieve being part of a lower sieve assembly and the grain pan being part of a grain pan assembly and wherein the grain pan assembly and the two sieve assemblies are connected to reciprocate in synchronism with one another, the grain pan assembly reciprocating in anti-phase with the upper sieve assembly but in phase with the lower sieve assembly.

5. A grain cleaning system as claimed in claim 4, wherein the combined mass of the grain pan assembly and the lower sieve assembly is substantially equal to the mass of upper sieve assembly.

6. A grain cleaning system as claimed in claim 4, wherein the upper sieve assembly is drivingly connected to the lower sieve assembly and the grain pan assembly by pairs of two-armed levers pivotably mounted on the frame.

7. A grain cleaning system as claimed in claim 6, wherein the front portion of the grain pan assembly is supported by a pair of the two-armed levers and the rear portion thereof by a pair of support arms.

8. A grain cleaning system as claimed in claim 6, wherein a pair of drive arms is connected between the front portion of the upper sieve assembly and the pair of two-armed levers connected to the grain pan assembly.

\* \* \* \* \*